US008773725B2

(12) United States Patent
Kinoshita

(10) Patent No.: US 8,773,725 B2
(45) Date of Patent: Jul. 8, 2014

(54) INFORMATION PROCESSING APPARATUS, IMAGE GENERATING METHOD, AND STORAGE MEDIUM

(71) Applicant: Koji Kinoshita, Tokyo (JP)

(72) Inventor: Koji Kinoshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/847,007

(22) Filed: Mar. 19, 2013

(65) Prior Publication Data

US 2013/0250366 A1    Sep. 26, 2013

(30) Foreign Application Priority Data

Mar. 23, 2012  (JP) ................. 2012-067669
Jan. 16, 2013  (JP) ................. 2013-005361

(51) Int. Cl.
  *G06K 15/00*  (2006.01)
  *H04N 1/40*  (2006.01)
(52) U.S. Cl.
  USPC ........... 358/3.28; 358/2.1; 358/1.9; 358/3.01; 358/3.1; 358/3.06
(58) Field of Classification Search
  None
  See application file for complete search history.

(56) References Cited

U.S. PATENT DOCUMENTS

| 5,353,359 | A  |    | 10/1994 | Urabe et al. |
| 6,957,024 | B2 |    | 10/2005 | Shinkawa et al. |
| 7,672,018 | B2 |    | 3/2010 | Kinoshita |
| 8,018,622 | B2 | *  | 9/2011 | Ono .............................. 358/2.1 |
| 8,045,232 | B2 |    | 10/2011 | Kinoshita |
| 8,072,649 | B2 |    | 12/2011 | Kinoshita |
| 8,085,444 | B2 |    | 12/2011 | Kinoshita |
| 2008/0309960 | A1 |    | 12/2008 | Kinoshita |
| 2012/0176652 | A1 | *  | 7/2012 | Green ......................... 358/3.28 |

FOREIGN PATENT DOCUMENTS

| JP | 2732342 | 3/1998 |
| JP | 2732343 | 3/1998 |
| JP | 2001-265181 | 9/2001 |
| JP | 2007-068032 | 3/2007 |
| JP | 2008-035112 | 2/2008 |
| JP | 2008-085385 | 4/2008 |
| JP | 4280460 | 6/2009 |

* cited by examiner

*Primary Examiner* — Quang N Vo
(74) *Attorney, Agent, or Firm* — IPUSA, PLLC

(57) ABSTRACT

An information processing apparatus includes a latent image generating unit and a background image generating unit. The latent image generating unit generates a latent image using both of a first color component to be printed with a first color material and second color components to be printed with second color materials having an optical property different from an optical property of the first color material, or generates the latent image using only the second color components. The background image generating unit generates a background image, which serves as the background of the latent image, using only the second color components when the latent image generating unit uses both of the first color component and the second color components, or generates the background image using both of the first color component and the second color components when the latent image generating unit uses only the second color components.

15 Claims, 8 Drawing Sheets

FIG.4
(A) LATENT IMAGE
　　　　0123456789 XXX SECTION RICH TARO
(B) BACKGROUND IMAGE
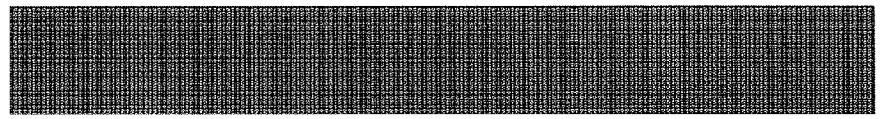
(C) EMBEDDED IMAGE (BACKGROUND IMAGE + LATENT IMAGE)
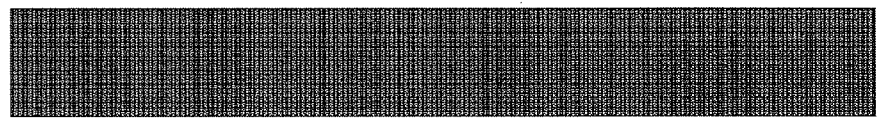
(D) INFRARED IMAGE
(E)
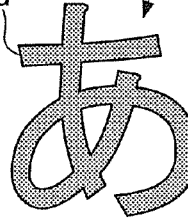
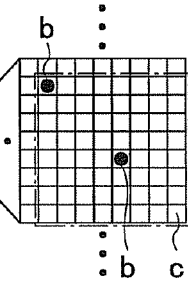
BOUNDARY d, a, b, c
(F) OUTPUT IMAGE
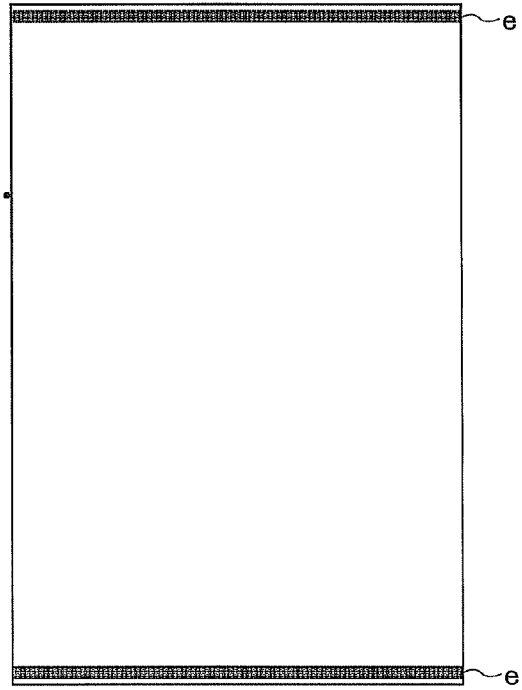

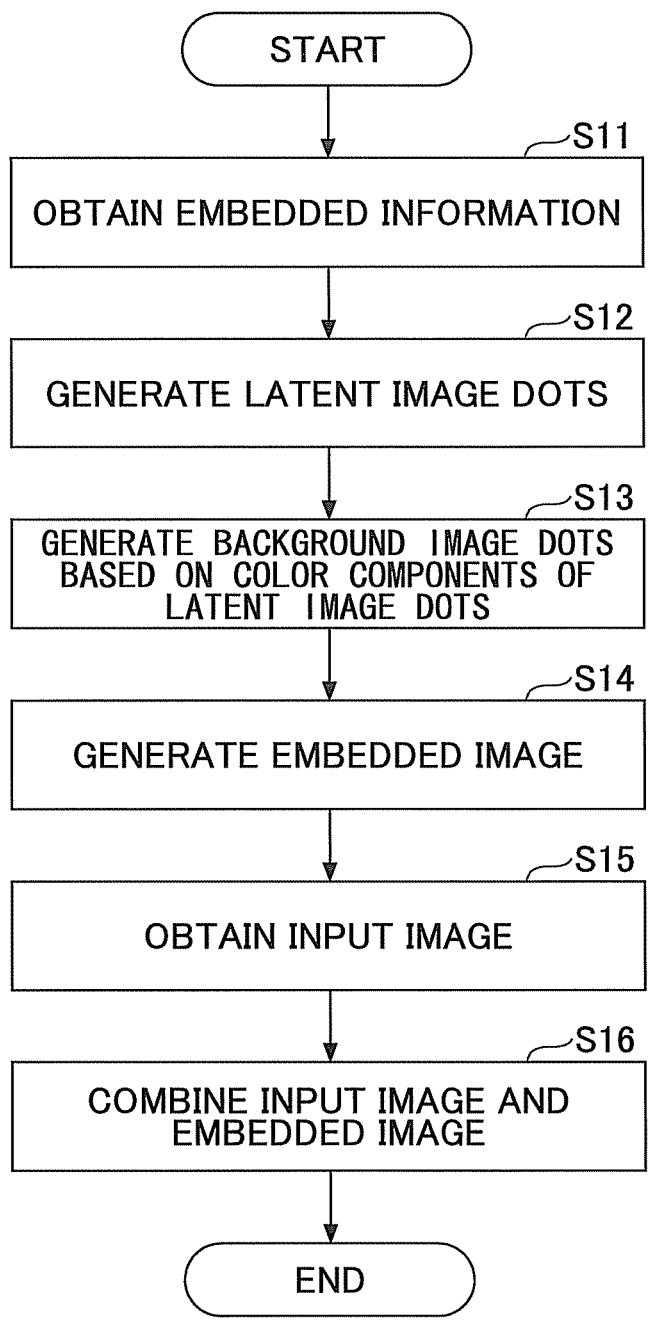

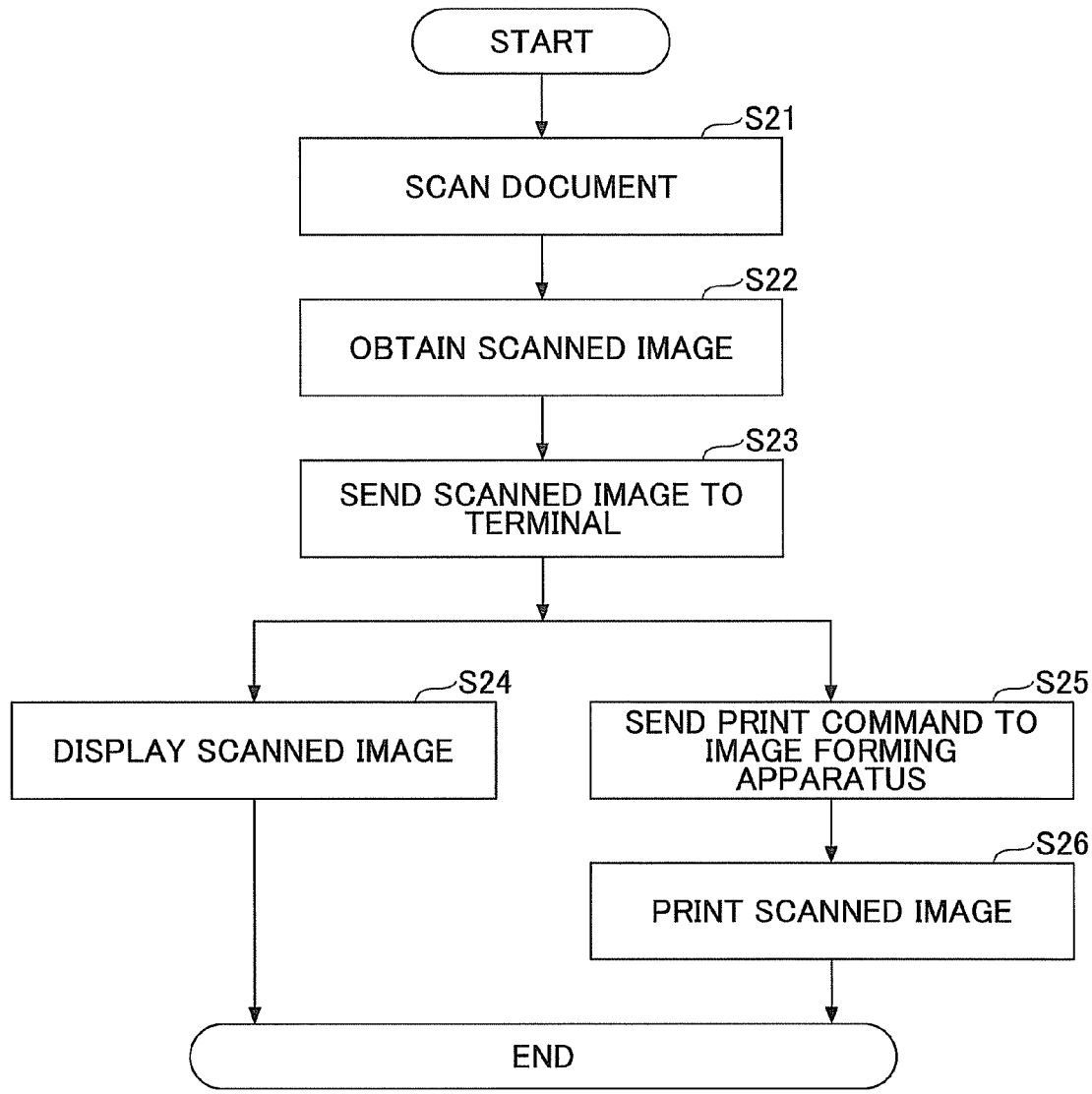

INFORMATION PROCESSING APPARATUS, IMAGE GENERATING METHOD, AND STORAGE MEDIUM

CROSS-REFERENCE TO RELATED APPLICATIONS

The present application is based upon and claims the benefit of priority of Japanese Patent Application No. 2012-067669 filed on Mar. 23, 2012, and Japanese Patent Application No. 2013-005361 filed on Jan. 16, 2013, the entire contents of which are incorporated herein by reference.

BACKGROUND OF THE INVENTION

1. Field of the Invention

An aspect of this disclosure relates to an information processing apparatus, an image generating method, and a storage medium.

2. Description of the Related Art

Apparatuses such as a multifunction peripheral including a copy function are used in our daily life or business to copy documents. With the advancement of copying technology, it has become difficult to distinguish between originals and copies. Also, when a document is repeatedly copied, it becomes difficult to determine the source or origin of the document.

For example, if a copy of a classified original document is circulated as the original, the security of the original document may be compromised. To prevent such a problem, it is necessary to guarantee (guarantee of originality) that a document is the original and not a copy. Also, to guarantee the security of documents, it is preferable to attach, to original documents, information regarding the original documents so that the sources or origins of copies and their distribution routes can be identified. To attach information to a document and thereby improve its security, it is preferable to process the document in such a manner that the processed results are normally not visible to human eyes.

Generally, carbon black having a light-absorption property is used as a black pigment for a black toner of an image forming apparatus. Here, Japanese Patent No. 4280460 discloses an image forming apparatus that uses a black toner having an infrared-reflection property. The image forming apparatus converts image data, which is obtained by scanning a document, into an electrostatic latent image, develops the electrostatic latent image using a developer including a black toner having an infrared-reflection property, and thereby forms an image having the infrared-reflection property on a recording medium such as paper. In Japanese Patent No. 4280460, a toner including a pigment that becomes white when reflecting infrared rays is used as the black toner having the infrared-reflection property.

Meanwhile, Japanese Laid-Open Patent Publication No. 2001-265181 discloses an image forming apparatus that forms an invisible image on a recording medium using a recording material that absorbs invisible light. More specifically, the image forming apparatus forms an invisible image on the recording medium under conditions that the difference in the maximum spectral reflectance in the visible light range between the recording medium and the recording material is less than or equal to 10% and the difference in the maximum spectral reflectance in the invisible light range between a visible image on the recording medium and the recording material is greater than or equal to 10%.

Further, Japanese Patent No. 2732342 and Japanese Patent No. 2732343 disclose technologies where an image is printed using an infrared-absorbing pigment over image information printed using an infrared-reflecting pigment to make the image information invisible to the naked eye. In the technology disclosed in Japanese Patent No. 2732342, an image is formed using a black ink made of an infrared-absorbing pigment over an image formed using a black ink made of an infrared-reflecting pigment. Similarly, in the technology disclosed in Japanese Patent No. 2732343, black toners made of two types of pigments are used.

According to the technology disclosed in Japanese Patent No. 4280460, an image is formed using a toner that reflects infrared rays when the image is copied. According to the technology disclosed in Japanese Laid-Open Patent Publication No. 2001-265181, an invisible image is formed on an original document using a toner that satisfies predetermined conditions. According to the technologies disclosed in Japanese Patent No. 2732342 and Japanese Patent No. 2732343, information printed on a card is hidden by forming an image over the information using a special toner.

Thus, in the related-art technologies described above, a special toner is used to add invisible information for distinguishing an original from a copy. With the related-art technologies, however, it is not possible to add invisible information to an original under circumstances where special toners are not usable.

SUMMARY OF THE INVENTION

In an aspect of this disclosure, there is provided an information processing apparatus that includes a latent image generating unit configured to generate a latent image, a background image generating unit configured to generate a background image that serves as a background of the latent image, and a print image generating unit configured to generate a print image including the latent image and the background image. The latent image generating unit is configured to generate the latent image using both of a first color component to be printed with a first color material and second color components to be printed with second color materials having an optical property different from an optical property of the first color material, or using only the second color components. The background image generating unit is configured to generate the background image using only the second color components when the latent image generating unit uses both of the first color component and the second color components, and generate the background image using both of the first color component and the second color components when the latent image generating unit uses only the second color components. The latent image generating unit and the background image generating unit are configured to generate the latent image and the background image using the first color component and the second color components such that the latent image and the background image in the print image are printed in substantially the same color.

BRIEF DESCRIPTION OF THE DRAWINGS

FIG. 4 is a drawing illustrating examples of a latent image, a background image, an embedded image, an infrared image, and an output image;

FIG. 5 is a flowchart illustrating an exemplary process of generating an output image;

FIG. 6 is a flowchart illustrating an exemplary process of obtaining a scanned image;

FIG. 7 is a drawing illustrating an example of an infrared image of a printed material according to a variation;

DESCRIPTION OF THE PREFERRED EMBODIMENTS

Preferred embodiments of the present invention are described below with reference to the accompanying drawings.

First Embodiment

<System Configuration>

Figure 1:
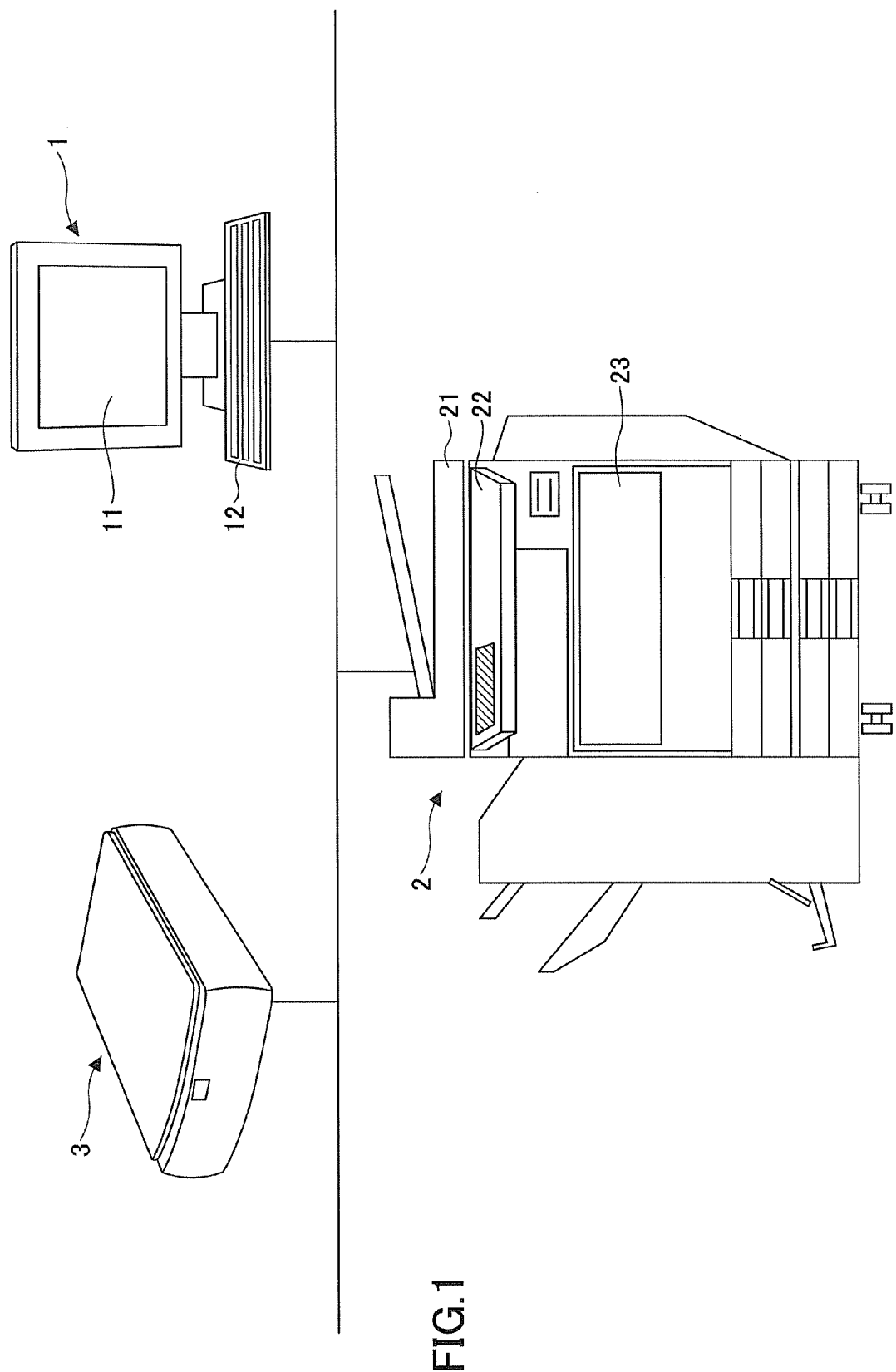
FIG. 1 is a drawing illustrating an exemplary system according to a first embodiment.

FIG. 1 is a drawing illustrating an exemplary system according to a first embodiment. FIG. 1 illustrates only components of the system that are necessary to describe the present embodiment.

The system may include a terminal (information processing apparatus) 1, an image forming apparatus 2, and an infrared scanner 3. The terminal 1 may be implemented by a general-purpose personal computer (PC) and may include a display unit 11 and an operations unit 12. Alternatively, the terminal 1 may be implemented by a mobile information terminal such as a cell phone, a smartphone, or a personal digital assistant (PDA). The image forming apparatus 2 may be implemented by, for example, a multifunction peripheral including a printing function. The image forming apparatus 2 may include an automatic document feeder (ADF) 21, an operations unit 22, and a laser printer 23. Alternatively, the image forming apparatus 2 may be implemented by a printer.

The terminal 1, the image forming apparatus 2, and the infrared scanner 3 are connected to each other via a network. With the configuration of FIG. 1, an image scanned by the image forming apparatus 2 can be transmitted via the network to the terminal 1. Also, an image generated by the terminal 1 can be transmitted via the network to the image forming apparatus 2 and can be printed on the image forming apparatus 2.

The infrared scanner 3 is an infrared device for scanning a printed material on which information is embedded according to an image forming method of the present embodiment. In the present embodiment, "printed material" indicates any type of recording medium on which an image is printed. For example, the infrared scanner 3 illuminates a document placed on a contact glass (not shown) of the infrared scanner 3 to scan the document, and converts reflected light (infrared rays) from the document into an electric signal by using a sensor (not shown) to obtain a scanned image (infrared image). The scanned image is transmitted to the terminal 1 and displayed on the display unit 11 of the terminal 1. The terminal 1 transmits a print command to request the image forming apparatus 2 to print the scanned image via the laser printer 23.

According to the present embodiment, embedded information is embedded in an input image received by the terminal 1 and then the input image is printed on the image forming apparatus 2. The embedded information (latent image) is printed on a recording medium such as paper using a color material including toner or ink that absorbs infrared rays, and therefore the printed embedded information (embedded image) is not visible to the naked eye. The embedded information can be made visible on a scanned image (infrared image) obtained by scanning the recording medium (or an image including the embedded information) with infrared rays using the infrared scanner 3.

In the descriptions below, it is assumed that the image forming apparatus 2 prints images on paper (or any other recording medium) via the laser printer 23 using toners corresponding to CMYK color components. However, the image forming apparatus 2 may instead be configured to print images on paper via an inkjet printer using inks corresponding to the CMYK color components. Also, the image forming apparatus 2 may use toners or inks corresponding to color components other than the CMYK color components. Meanwhile, the image forming apparatus 2 uses toners or inks having different properties for a certain type of radiation such as infrared rays or ultraviolet rays. In the present embodiment, it is assumed that the image forming apparatus 2 uses toners having an infrared-absorption property, and also toners not having an infrared-absorption property.

The infrared scanner 3 is not necessarily connected via the network to the terminal 1 and the image forming apparatus 2. For example, a removable medium may be used to input a scanned image to the terminal 1 and the image forming apparatus 2. Also, the image forming apparatus 2 and the infrared scanner 3 may be combined into a single apparatus. The infrared scanner 3 may be replaced with an image input device such as a camera capable of detecting infrared rays or a mobile information terminal such as a cell phone, a smartphone, or a PDA including such a camera.

<Hardware Configuration of Terminal>

Figure 2:
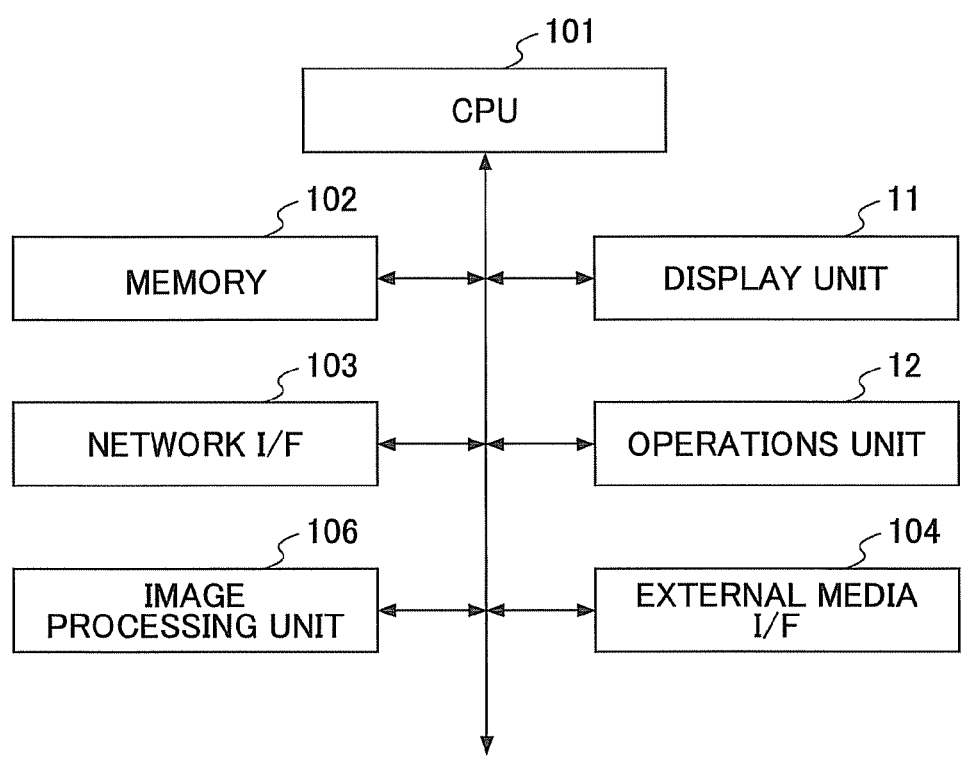
FIG. 2 is a block diagram illustrating an exemplary hardware configuration of a terminal.

An exemplary hardware configuration of the terminal 1 is described below. FIG. 2 is a block diagram illustrating an exemplary hardware configuration of the terminal 1.

The terminal 1 may include a display unit 11, an operations unit 12, a central processing unit (CPU) 101, a memory 102, a network I/F 103, an external media I/F 104, and an image processing unit 106.

The CPU 101 executes various processes according to programs stored in the memory 102. The memory 102 may include a read-only memory (ROM), a random access memory (RAM), and/or a hard disk drive (HDD), and stores the programs executed by the CPU 101. The display unit 11 is implemented, for example, by a liquid-crystal display or a cathode-ray tube (CRT) display. The display unit 11 displays, for example, embedded images to be embedded in input images, scanned images received from the infrared scanner 3, and information regarding operations of the terminal 1. The operations unit 12 includes, for example, a keyboard and a mouse and receives user inputs.

The network I/F 103 is an interface for connecting the terminal 1 to the network and enables the terminal 1 to communicate with the image forming apparatus 2 and the infrared scanner 3. The external media I/F 104 is an interface or a media drive for removable media such as a digital versatile disk (DVD) and a compact disk (CD). For example, programs recorded in a DVD can be downloaded via the external media I/F 104 into the terminal 1.

The image processing unit 106 performs image processing on input images input to the terminal 1. For example, the image processing unit 106 combines an embedded image indicating embedded information and an input image. This process is described in detail later. The image processing unit 106 may be implemented by executing a program stored in the memory 102 by the CPU 101. The terminal 1 including the CPU 101 and the memory 102 is an example of a computer.

The program for implementing the image processing unit 106 may be installed, for example, in the memory 102 of the terminal 1 as a printer driver or an application of a cell phone or a smartphone. Alternatively, the program may be installed in the image forming apparatus 2. In this case, the image forming apparatus 2 also functions as the terminal 1.

<Functional Configuration of Image Processing Unit>

Figure 3:
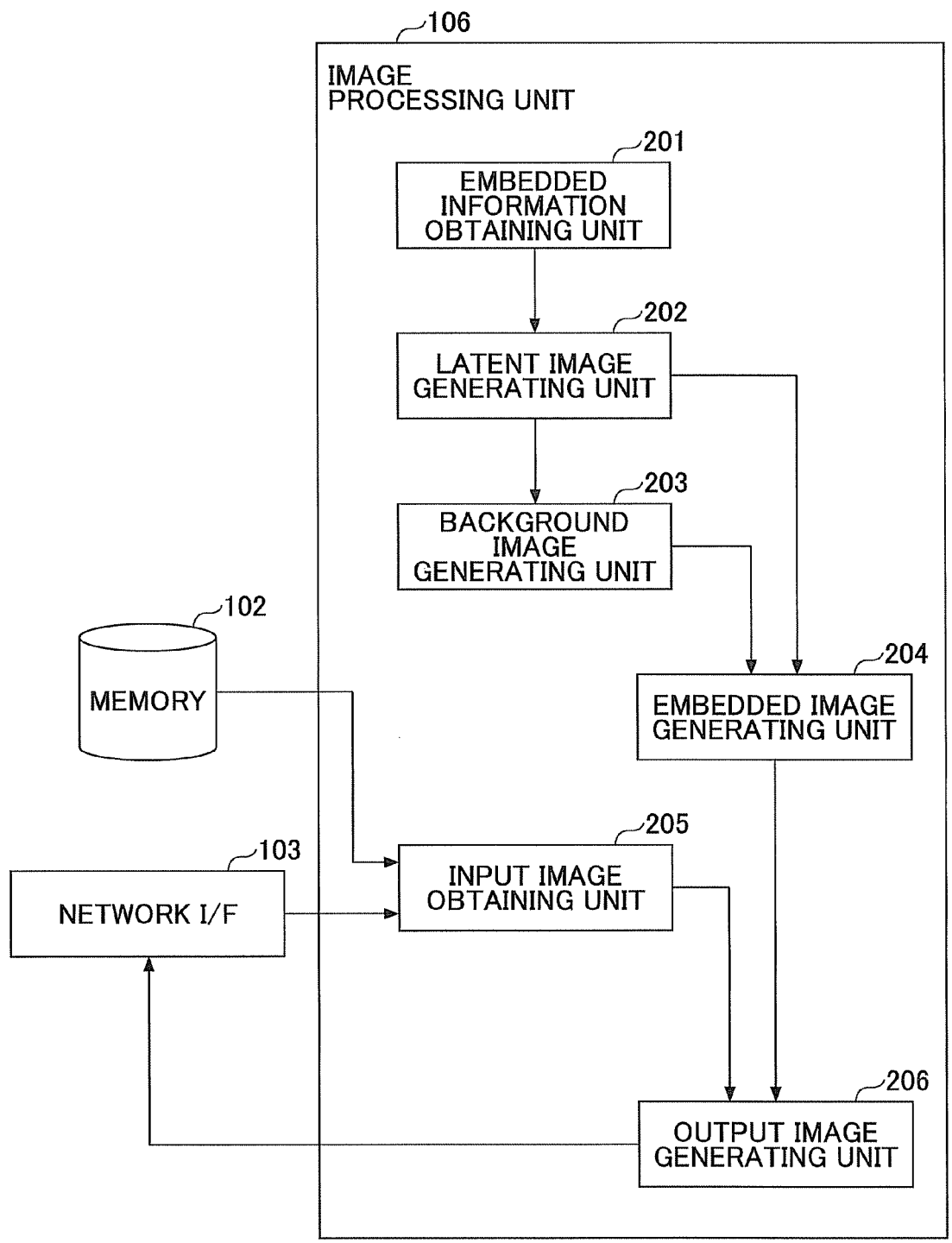
FIG. 3 is a block diagram illustrating an exemplary functional configuration of an image processing unit.

Next, an exemplary functional configuration of the image processing unit 106 is described with reference to FIG. 3.

The image processing unit 106 may include an embedded information obtaining unit 201, a latent image generating unit 202, a background image generating unit 203, an embedded image generating unit 204, an input image obtaining unit 205, and an output image generating unit 206. The embedded image generating unit 204 and the output image generating unit 206 may be collectively referred to a "print image generating unit".

In the present embodiment, a latent image indicating embedded information to be embedded in an another image and a background image that serves as the background of the latent image are generated, and the latent image and the background image are combined to generate an embedded image. Then, the terminal 1 superposes the embedded image on a received input image to generate an output image, and the image forming apparatus 2 prints the output image. The embedded image and the output image are examples of print images.

The embedded information obtaining unit 201 obtains embedded information. The embedded information may indicate, for example, "when, where, and by whom an image was printed" (i.e., information indicating the source or origin of the image). The embedded information may be input by the user via the operations unit 12 or may be obtained from information attached to data of an input image to be printed. The latent image generating unit 202 receives the embedded information from the embedded information obtaining unit 201 and generates a latent image representing a character string indicating the embedded information by using cyan (C), magenta (M), yellow (Y), and black (K) color components.

The background image generating unit 203 obtains the CMYK color components of the latent image generated by the latent image generating unit 202, and generates a background image using the CMY color components out of the obtained CMYK color components. Details of the background image and the latent image are described later. The embedded image generating unit 204 generates an embedded image by combining the latent image and the background image.

The input image obtaining unit 205 obtains an input image received by the terminal 1. The input image may be obtained from the memory 102 or obtained via the network I/F 103 and the network from an external apparatus. The output image generating unit 206 combines the input image received from the input image obtaining unit 205 and the embedded image received from the embedded image generating unit 204 to generate an output image. The generated output image is transmitted via the network I/F 103 to the image forming apparatus 2 and printed by the image forming apparatus 2.

Although the latent image generating unit 202 and the background image generating unit 203 are provided as separate functional units in the present embodiment, the latent image generating unit 202 and the background image generating unit 203 may be combined into a single functional unit. In other words, the latent image and the background image may be generated by the same software component.

<Infrared-Reflection Property of Background Image and Latent Image>

Next, the background image and the latent image are described with reference to FIG. 4.

FIG. 4 (A) is an example of a latent image. The latent image represents embedded information that indicates, for example, "when, where, and by whom an image was printed". The latent image or the embedded information is not necessarily expressed by a character string, but may be expressed in any other information format that can provide information for identifying an original image or document. The latent image is generated using the CMYK color components. FIG. 4 (B) is an example of a background image. The background image is generated using the CMY color components. FIG. 4 (C) is an embedded image obtained by combining the latent image of FIG. 4 (A) and the background image of FIG. 4 (B).

In a laser printer using toners corresponding to the CMYK color components (which are hereafter referred to as "CMYK toners"), carbon black is used for the K toner. Carbon black has a light-absorption property. Particularly, carbon black absorbs infrared rays. Since carbon black is used only in the K toner among the CMYK toners, the CMY toners do not absorb infrared rays. The K toner is an example of a second color material.

In the present embodiment, dots of the latent image (latent image dots) are generated using color components including the K color component, and dots of the background image (background image dots) that serves as the background of the latent image are generated using the CMY color components. The embedded image including the latent image dots and the background image dots is combined with an input image, and the combined image is printed on paper (which may be referred to as a "printed material"). The latent image dots and the background image dots on the printed material have different reflection properties with respect to infrared rays. Embedded information represented by the latent image dots can be recognized based on the different reflection properties. Each of the CMY toners is an example of a first color material.

FIG. 4 (D) is an infrared image obtained by scanning, with infrared rays, a printed material on which the embedded image of FIG. 4 (C) is printed. Here, the latent image dots in the embedded image represent embedded information and are printed using the CMYK toners including the K toner that absorbs infrared rays. Meanwhile, the background image dots in the embedded image are printed using the CMY toners that reflect infrared rays. For this reason, as illustrated by FIG. 4 (D), the latent image (in this example, a character string), which absorbs infrared rays, looks darker (or more blackish) than the background image and is distinguishable from the background image. In other words, the latent image or the embedded information (in this example, "0123456789 XXX SECTION RICH TARO" is visible to the naked eye.

<Color Adjustment of Latent Image and Background Image>

In the present embodiment, as described above, the dots of a latent image are generated using the CMYK color components, the dots of a background image are generated using the CMY color components, and the latent image dots are combined with the background image dots to generate an embedded image. Here, if the color of the background image dots is different from the color of the latent image dots on a printed material, the latent image becomes visible to the naked eye and it is not preferable. For this reason, the color of the background image dots and the color of the latent image dots are adjusted such that they are not distinguishable by the naked eye from each other.

It is known that when equal proportions of the CMY color components are mixed, the resulting color looks (to the naked eye) substantially the same as the K color component. However, in each dot composed of the CMY color components, the CMY color components printed using the corresponding toners do not completely overlap each other. Therefore, even when a dot is printed using the CMY toners to look substantially the same as a dot printed using the K toner to the naked eye, a copier detects the respective CMY color components in the dot instead of a K color component. Meanwhile, when a dot is printed using the CMYK toners, a copier detects the respective CMYK color components in the dot.

In the present embodiment, the density values of the CMY color components used to generate the background image dots are obtained by removing the K color component from the CMYK components constituting one dot of the latent image and adding equal density values corresponding to the removed K color component to the respective density values of the CMY color components of the dot of the latent image. Also, the brightness, hue, and saturation of the background image dots are adjusted so that the color of the background image dots matches the color of the latent image dots. By adjusting the colors of the background image and the latent image as described above, it is possible to generate an embedded image as illustrated by FIG. 4 (C) where the latent image dots are not distinguishable by the naked eye from the background image dots.

For example, the density value of the K color component among the CMYK color components constituting each dot of the latent image is set to 0. Next, the density values of the CMY color components are increased by an amount corresponding to the original density value (i.e., the density value before being set to 0) of the K color component to obtain tentative density values of the CYM color components for each dot of the background image. Then, taking into account the nonlinearity in the brightness that may occur when the CMY color components are mixed, the tentative density values of the CMY color components are adjusted (or corrected) to obtain final density values of the CMY color components. This adjustment (or correction) process may be performed by a color-component value correction unit.

The density values of the CMY color components constituting the background image dots may be adjusted (or corrected), for example, using methods as described below. In an exemplary method, correction values for correcting the CMY color components are obtained in advance through an experiment for all possible combinations of the density values of the CMYK color components constituting each dot of the latent image, and stored in a table (the combinations of the density values and/or the stored correction values may be referred to as "condition information"). In another exemplary method, correction values for correcting the CMY color components are obtained for respective combinations of equally-spaced density ranges of the CMYK color components, and stored in a table (the combinations of the density ranges and/or the stored correction values may be referred to as "condition information"). The latter method makes it possible to reduce the size of the table. When the latter method is used, the accuracy of correction may be improved by using linear approximation for combinations of density values within each density range.

In the above described embodiment, the density values of the CMY color components for each dot of the background image are obtained by removing the K color component from the CMYK color components constituting one dot of the latent image and increasing the density values of the remaining CMY color components by an amount corresponding to the removed K color component. However, the present invention is not limited to the above described embodiment. For example, to make the color of the dots of a printed latent image including the K color component look substantially the same as the color of the dots of a printed background image not including the K color component, the density values of the CMY color components constituting each dot of the background image may be subtracted from the density values of the CMY color components constituting each dot of the latent image and the density value of the K color component may be increased by an amount corresponding to the subtracted density values of the CMY color components to obtain tentative density values of the CMYK components for each dot of the latent image. Also in this case, the tentative density values of the CMY (or CMYK) color components may be adjusted (or corrected) taking into account the nonlinearity in the brightness, which may occur when the CMY (or CMYK) color components are mixed, to obtain final density values of the CMYK color components. This adjustment (or correction) process may also be performed by a color-component value correction unit. As described above, correction values obtained in advance and stored in a table may be used for the adjustment (or correction) process.

In the present embodiment, it is assumed that CMYK toners are used to print the latent image and the background image. However, any other color system (or model) may also be used. For example, the above described methods of adjusting colors of the latent image and the background image may be applied to a case where five color toners including the CMYK toners and a spot-color toner are used and even to a case where six color toners are used. That is, any color system or any number of color toners or inks may be used as long as an embedded image is formed using a combination of a color material having an infrared-absorption property and a color material having no infrared-absorption property.

Further, color materials having different optical properties for a type of radiation (or light) other than infrared rays may also be used. For example, a color material such as toner or ink that reflects ultraviolet rays may be included in color materials used for printing either one of the latent image or the background image. In this case, it is possible to distinguish latent image dots from background image dots based on the difference in ultraviolet reflectance between the latent image dots and the background image dots on a printed material.

When using a color material reflecting ultraviolet rays, one of the three methods described below may be employed. In a first method, a "transparent" toner including a material that reflects ultraviolet rays is used as a spot-color toner, and one of the latent image dots and the background image dots are generated using color components including a "transparent" color component so that those dots are printed using toners including the transparent toner. A transparent toner is generally used to give a gloss to a printed material. When the latent image dots or the background image dots are printed using the transparent toner, it is difficult to distinguish the latent image and the background image on a printed material by the naked eye since the transparent toner is "transparent". However, with careful observation, the latent image and the background image may be distinguishable based on the presence or absence of the gloss. Meanwhile, when the printed material (original) is copied by a copier, the gloss is not reproduced on the copy since the copier cannot detect the transparent toner. Thus, whether a printed material is an original or a copy can be determined based on the presence or absence of a gloss. Thus, similarly to the above described method where the K color component is used to distinguish the latent image and the background image, this approach also makes it possible to guarantee the originality of a printed material.

In a second method, a material that reflects ultraviolet rays is included in, for example, the Y toner. In this case, one of the latent image dots and the background image dots are generated using the CM color components and the other one of the latent image dots and the background image dots are generated using the CMY color components. Even in this case, when the area ratio of the Y toner in the dots is small (e.g., 5%), it is extremely difficult to distinguish the latent image dots from the background image dots by the naked eye. Therefore, it is not possible (or at least difficult) to distinguish the latent image dots from the background image dots on a printed material by the naked eye while it is possible to distinguish between them by detecting ultraviolet rays reflected from the printed material. Thus, similarly to the above described method where the K color component is used to distinguish the latent image and the background image, this approach also makes it possible to guarantee the originality of a printed material.

In a third method, a material that reflects ultraviolet rays is included in the K toner. In this case, the K toner is used in substantially the same manner as in the above described method using the K toner that reflects infrared rays. The third method also makes it possible to guarantee the originality of a printed material. The third method is applicable when a color material that does not absorb infrared rays is used as the K toner.

When the second or third method is used to enable tracing of the origin of a printed material as described later, a copier for copying an original printed material needs to use a Y toner including an ultraviolet-reflecting material or a K toner including an ultraviolet-reflecting material. With such a copier, it is possible to copy or reproduce the latent image dots or the background image dots that are generated using the Y or K color component with the Y or K toner including an ultraviolet-reflecting material. In this case, embedded information represented by the latent image can be detected even on the copy based of the difference in ultraviolet reflectance. A method for enabling a copier to copy the latent image dots or the background image dots using the Y or K toner including an ultraviolet-reflecting material may be substantially the same as the method (described in a second embodiment) for enabling a copier to copy the latent image dots or the background image dots using the K toner. For example, the dots to be copied using the Y or K toner may be arranged such that the area ratio (or proportion) of the dots exceeds a threshold (e.g., 5%). Alternatively, the dots to be copied using the Y or K toner may be arranged such that they are not detected as "dispersed dots" (isolated points).

<Reproduction Characteristics of Latent Image>

The above described methods make it possible to generate an output image including a latent image that is not visible to the naked eye on a printed material but is detectable in an infrared image obtained by scanning the printed material with infrared rays. Here, when an original printed material, on which the output image is printed, is copied such that the latent image dots are exactly reproduced, the copied printed material has the same infrared-reflection property as the original printed material. In this case, it is not possible to distinguish the original printed material from the copied printed material and the latent image cannot be used to guarantee the originality of the original printed material. In the present embodiment, to make it possible to distinguish an original printed material from its copy, latent image dots are generated in such a manner that they cannot be copied using a color material that has a reflection property different from the reflection property of a color material used for the background image.

FIG. 4 (E) illustrates an image "a" that is a latent image representing a Japanese character "あ". In FIG. 4 (E), "d" indicates a boundary between the latent image and the background image. That is, the latent image is within the boundary "d" and the background of the character "あ" is not a part of the latent image. In the present embodiment, "background image dots" are also placed in a portion (pixels) "c" of the area within the boundary "d" where dots "b" of the latent image are not placed. Although the boundary "d" is indicated by a solid line in FIG. 4 (E) for illustration purposes, such a solid line is not present in an actual image.

A copier typically has a function to determine whether a detected minute image is dust on a document or a contact glass. For example, when the area ratio of an image is less than or equal to a predetermined threshold (e.g., 5%) and the image is composed of dispersed dots (isolated points), the copier determines that the image is dust and does not copy the image. In FIG. 4 (E), the image "a" includes the dots "b" and the portion (pixels) "c" where the dots "b" are not placed. Assuming that the dots "b" are placed only in two pixels in a matrix of 8×8 pixels (64 pixels), the area ratio of the dots "b" in the image "a" is 2/64=0.03125 which is less than the threshold of 5%.

Since the dots "b" represent the latent image, the dots "b" include the K color component. Meanwhile, the "background image dots" placed in the pixels "c" do not include the K color component. Here, the copier determines whether an image is dust for each color component. Accordingly, in this exemplary case, the K color components of the dots "b" are determined as dust and the dots "b" are not copied as the K color components. Here, "not copied as the K color components" means that the dots are not copied using the K toner. Thus, when a document including the image "a" including the dots "b" is copied, the image "a" is not copied using the K toner. "Area ratio" in the above descriptions is an example of "proportion per unit area".

Thus, in the present embodiment, embedded information is expressed by dispersed dots (isolated points) so that it is not copied using the K toner. As described above, a latent image includes dispersed dots (e.g., dots "b" in FIG. 4 (E)) representing embedded information and a portion (e.g., pixels "c" in FIG. 4 (E)) where the dispersed dots are not placed, and the dispersed dots are arranged such that their area ratio in the latent image becomes less than a predetermined threshold (e.g., 5%). With this method, when an embedded image including the latent image is copied, the dots (e.g., the dots "b") representing the embedded information are not copied (or printed) using the K toner. That is, while latent image dots on an original document prepared as described above can be detected by scanning the original document with infrared rays, latent image dots on a copy of the original document cannot be detected by scanning the copy with infrared rays because the latent image dots are not copied using the K toner. Thus, the above method makes it possible to determine whether a printed material is an original or a copy based on an infrared image obtained by scanning the printed material with infrared rays and thereby makes it possible to guarantee the originality of the printed material.

As described above, the "background image dots" are placed in the pixels "c" within the boundary "d" of the image "a" illustrated by FIG. 4 (E). Accordingly, on an original printed material, the dots "b" of the latent image are printed using toners including the K toner and the "background image dots" (pixels "c") are printed using toners not including the K toner. Here, the copier determines whether an image is composed of dispersed dots for respective color components including the K color component. Similarly, the copier determines the area ratio of an image for respective color components including the K color component. Also, even when the "background image dots" are placed in all of the pixels "c" in the image "a" of FIG. 4 (E), only the dots "b" including the K color component are printed on an original printed material using toners including the K toner.

Therefore, the K color components of the dots "b" of the latent image printed with the K toner on the original printed material are determined by the copier as dispersed dots (isolated points). Also, the area ratio of the dots "b" of the latent image is determined to be 2/64=0.03125, i.e., less than 5%. In this case, the K color components of the dots "b" printed with the K toner are treated the same as dust and therefore not copied using the K toner. That is, when an original printed material with an embedded image including the latent image is copied, the dots "b" representing the embedded information are not copied (or printed) using the K toner. Accordingly, the latent image on the copied printed material cannot be distinguished from the background image even using an infrared image obtained by scanning the copied printed material with infrared rays. Meanwhile, on the original printed material, the dots "b" of the latent image representing the embedded information are printed using the K toner and therefore the latent image can be distinguished from the background image using an infrared image of the original printed material. Thus, the above method makes it possible to determine whether a printed material is an original or a copy by scanning the printed material with infrared rays.

On an original printed material, as described above, the color of the dots "b" of the latent image and the color of the "background image dots" (pixels "c") are adjusted such that they are not distinguishable from each other by the naked eye. Still, however, a copier can distinguish the color of the dots "b" of the latent image from the color of the "background image dots" (pixels "c"). For example, on an original printed material, each dot "b" of the latent image is printed using toners (e.g., CMYK toners) including the K toner and each dot of the background image (pixel "c") is printed using toners (e.g., CMY toners) not including the K toner. Here, in each dot "b" of the latent image composed of CMYK color components (or CMYK toners), the CMYK color components do not completely overlap each other. Similarly, in each dot (pixel c) of the background image composed of CMY color components (or CMY toners), the CMY color components do not completely overlap each other. As a result, the copier detects the K color component (or K toner) in each dot "b" of the latent image, but does not detect the K color component in each dot (pixel "c") of the background image. Accordingly, the copier can distinguish the dot "b" of the latent image from the dot of the background image based on whether the K color component (K toner) is detected. For the reasons described above, when an embedded image including the latent image is copied, the dots "b" representing embedded information are not copied (or printed) using the K toner.

The K toner or the K color component is detected, for example, as described below. A scanner of a copier scans an original printed matter and obtains the values (0-255) of RGB color components in reflected light from the original printed matter. When the value of every one of the RGB color components of a dot are 255 (R, G, B=255, 255, 255), the copier determines that the dot includes the K toner, i.e., detects the K toner. In each dot "b" of the latent image printed on the original printed material, the CMYK color components (or toners) do not completely overlap each other. Since every one of the RGB color components in reflected light from the K color component in the dot "b" of the latent image has a value of 255, it is possible to detect the K color component (or the K toner) in the dot "b" of the latent image. Meanwhile, in each dot (pixel c) of the background image, the CMY color components (or toners) do not completely overlap each other. In this case, not all of the RGB color components in reflected light from each of the CMY color components in the dot (pixel "c") of the background image have a value of 255. Also, not all of the RGB color components in reflected light from a part of the dot (pixel "c") where the CMY color components overlap each other have a value of 255. Thus, in this case, the K color component (or the K toner) is not detected in the dot of the background image.

Referring to FIG. 4 (E) again, different from the dots "b" of the latent image, the background image dots placed inside and outside the boundary "d" are not "dispersed" and have an area ratio greater than 5%. Therefore, a copier copies the background image dots using the CMY toners. Meanwhile, as described above, the K color components of the dots "b" printed with the K toner are determined as dust and not copied using the K toner. As a result, on a copied printed material, the K toner is removed from the dots "b" of the latent image "a" and the color of the latent image "a" is diluted (or its density is reduced). This may cause a difference in color between the inside and the outside of the boundary "d" of the latent image "a". However, even when such a color difference is present, since the dots "b" of the latent image are dispersed and have an area ratio of 5% or less, the color difference is reduced to such a degree that the difference is not detectable by the naked eye during an analog process of scanning the original printed material and detecting the reflected light from the original printed material. Therefore, practically, the color difference between the inside and the outside of the boundary "d" of the latent image "a" is not detectable by the naked eye.

With the above described method, the latent image and the background image on a copied printed material are distinguishable neither by the naked eye nor by using an infrared image obtained by scanning the copied printed material with infrared rays. Meanwhile, the latent image and the background image on an original printed material are distinguishable by using an infrared image obtained by scanning the original printed material with infrared rays. Thus, the above embodiment makes it possible to distinguish an original from a copy by detecting infrared rays reflected from a printed material and thereby makes it possible to guarantee the originality of the printed material.

The term "dispersed dots (isolated points)" in the above descriptions do not only indicate a dot pattern (or arrangement) where dots are not adjacent to each other. For example, the term "dispersed dots (isolated points)" may also indicate a dot pattern where two dots are adjacent to each other but no dot is present adjacent to the two dots (in other words, not more than two dots are adjacent to each other). Thus, the term "dispersed dots (isolated points)" may indicate a dot pattern where dots are not adjacent to each other or where not more than two dots are adjacent to each other. Further, the definition of the term "dispersed dots (isolated points)" may be expanded to include a dot pattern where three or more dots are adjacent to each other. The dot pattern where dots are not adjacent to each other may be referred to as an "isolated dot pattern" or a "dispersed dot pattern". The dot pattern where not more than a specified number (two, three, or more) of dots are adjacent to each other may be referred to as a "quasi-isolated dot pattern" or a "quasi-dispersed dot pattern".

(Embedded Image and Output Image)

FIG. 4 (F) is an example of an output image. As described above, information (embedded information) that is not detectable by the naked eye can be added to a document by combining an embedded image including a background image and a latent image with an input image received by the terminal 1. According to the present embodiment, when a copy of the document (original) is made, the information (embedded information) is virtually not reproduced on the copy. This makes it possible to determine whether a document is an original or a copy based on an infrared image obtained by scanning the document with infrared rays. That is, on an infrared image of the original document, the latent image dots printed using the K toner are distinguishable from the background image and therefore the embedded information can be detected. Meanwhile, on an infrared image of the copy, the latent image dots are not distinguishable from the background image and the embedded information cannot be detected since the latent image dots are copied not using the K toner.

Figure 8:
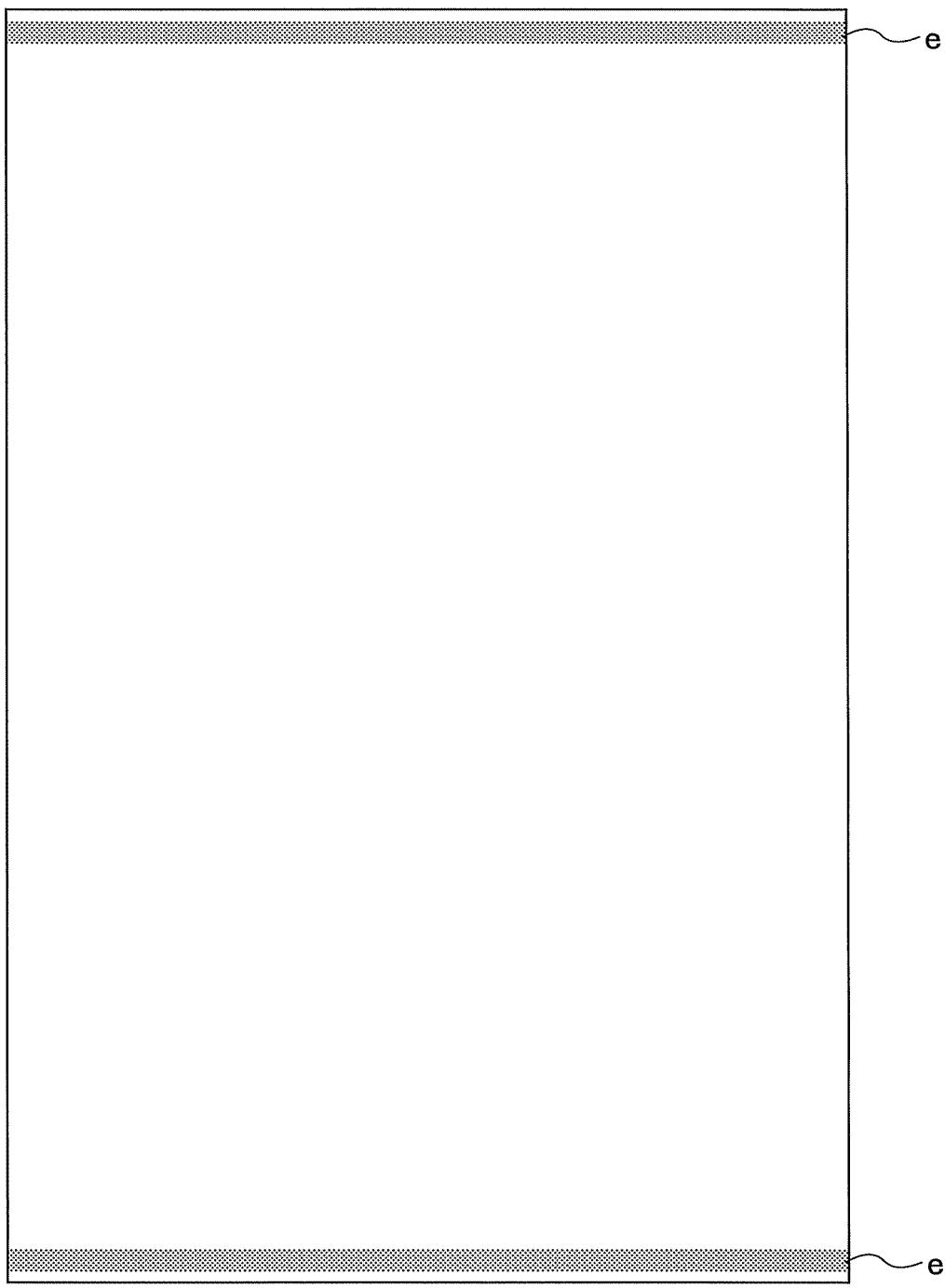
FIG. 8 is a drawing illustrating another example of an output image.

FIG. 8 is a drawing illustrating another example of an output image. The density of an embedded image "e" in the output image of FIG. 8 is lower than the density of an embedded image "e" in the output image of FIG. 4 (F) and looks paler. More specifically, the dot density of the embedded image "e" of FIG. 8 is lower than the dot density of the embedded image "e" of FIG. 4 (F). This difference in dot density is described in more detail below with reference to FIG. 4 (E).

In the inside (within the boundary "d") of the latent image "a" of FIG. 4 (E), the background image dots are placed in the pixels "c" where the dots "b" of the latent image are not placed. However, the present invention is not limited to the example of FIG. 4 (E). For example, no dot (or white or transparent dots) may be placed in the pixels "c" in the image "a". In this case, the dot density inside of the latent image "a" becomes low (e.g., 2/64). Here, on an original printed material, to make the latent image "a" with the low dot density not distinguishable from the background image outside of the boundary "d", it is necessary to make the dot density of the background image the same as the dot density (2/64) of the latent image "a". This is because even when the color of the dots of the latent image "a" is substantially the same as the color of the background image dots, the latent image "a" and the background image may be distinguishable from each other if their dot densities are different. When the latent image "a" and the background image are generated at the same low dot density (e.g., 2/64), both the latent image "a" and the background image are determined as dust and are not copied by the copier. Thus, this method makes it possible to easily distinguish an original from a copy by the naked eye since the embedded image is actually not copied and therefore makes it possible to guarantee the originality of a printed material.

The embedded image "e" in the output image of FIG. 8 may also be generated with a method different from the above described method where no dot is placed in the pixels "c" in the latent image "a". For example, the embedded image "e" in the output image of FIG. 8 may be generated by placing the background image dots in the pixels "c" in the latent image "a" and outside of the boundary "d" such that the dot density of the entire embedded image "e" is reduced. In other words, the dot density (area ratio or proportion of dots) of the entire embedded image "e" including the latent image "a" and the background image outside of the boundary "d" is reduced compared with a case where dots are placed in all pixels constituting the embedded image "e" as exemplified by FIG. 4 (E). Also in this case, the colors of dots and the dot densities (area ratios or proportions of dots) inside and outside of the boundary "d" of the latent image "a" are adjusted to become substantially the same so that the latent image "a" is not distinguishable from the background image.

Thus, according to the present embodiment, the density (or dot density) of an embedded image may be determined freely. According to the present embodiment, the latent image dots in an embedded image are printed using toners including the K toner and the background image dots are printed using toners not including the K toner, and they are still printed in substantially the same color. In the resulting embedded image printed on an original printed material, the latent image and the background image are not distinguishable from each other by the naked eye. However, the latent image is distinguishable from the background image on an infrared image obtained by scanning the original printed material with infrared rays, and therefore the embedded information represented by the latent image can be detected. The latent image dots are printed in a dispersed dot pattern and the area ratio of the latent image dots is made less than or equal to a predetermined threshold so that the latent image dots are not copied using the K toner. As a result, the embedded information represented by the latent image is not detectable on an infrared image of a copied printed material. Thus, the present embodiment makes it possible to distinguish a copy from an original and thereby makes it possible to guarantee the originality of a printed material.

<Process of Generating Output Image>

Next, an exemplary process of generating an output image is described with reference to FIG. 5.

At step S11, the embedded information obtaining unit 201 obtains embedded information to be embedded in an input image.

At step S12, the latent image generating unit 202 generates dots of a latent image (latent image dots) using color components (e.g., CMYK color components) including the K color component in a dispersed dot pattern based on the embedded information received from the embedded information obtaining unit 201.

At step S13, the background image generating unit 203 receives (information on) the CMYK color components of the latent image dots from the latent image generating unit 202, sets the K color component to 0, adds equal values corresponding to the K color component to the respective CMY color components to obtain CMY color components for a background image, and generates dots of the background image (background image dots) based on the obtained CMY color components.

At step S14, the embedded information generating unit 204 generates an embedded image by combining the latent image dots generated by the latent image generating unit 202 and the background image dots generated by the background image generating unit 203.

At step S15, the input image obtaining unit 205 obtains an input image via the network I/F 103. At step S16, the output image generating unit 206 generates an output image by combining the input image received from the input image obtaining unit 205 and the embedded image received from the embedded image generating unit 204. In the above exemplary process, the input image is obtained by the input image obtaining unit 205 at step S15. However, the input image may instead be obtained at any other appropriate timing. For example, the input image may be obtained before embedded information is obtained at step S11.

Also in the above exemplary process, the latent image dots are generated first and then the background image dots are generated based on the color components of the latent image dots. However, the background image dots may be generated before the latent image dots. In this case, the background image dots are generated using, for example, the CMY color components and information on the CMY color components is sent to the latent image generating unit 202. The latent image generating unit 202 determines color components including the K color component based on the CMY color components of the background image dots, and generates the latent image dots representing the embedded information based on the determined color components in a dispersed dot pattern. The latent image dots in the dispersed dot pattern are arranged such that the area ratio (or proportion per unit area) of the latent image dots becomes less than or equal to a predetermined threshold. As described above with reference to FIG. 4 (E), the background image dots are also placed in the pixels "c" (where the latent image dots are not placed) inside of the boundary "d" of the latent image.

Regardless of whether the background dots or the latent image dots are generated first, the above described method has features and effects as described below. In the above method, the relationship between the density value of the K color component of the latent image dots and the density values of the CMY color components (obtained by converting the density value of the K color component) of the background image dots is adjusted (or corrected). This makes it possible to generate an embedded image where the latent image dots are not distinguishable from the background image dots. Also, since the embedded information is represented by dispersed (isolated) dots, the embedded information is not copied by a copier using the K toner. This in turn makes it possible to determine whether a printed material is an original or a copy by determining whether the embedded information is detectable on an infrared image obtained by scanning the printed material with infrared rays.

The exemplary output image of FIG. 4 (F) is generated by combining a white input image and an embedded image. Meanwhile, when an output image is generated by combining a color input image with an embedded image, it is possible to prevent the embedded image itself from being detected by adjusting the color of the embedded image. This can be achieved through a process as described below. The input image obtaining unit 205 obtains CMYK color components of an input image and sends information indicating the CMYK color components to the background image generating unit 203. The background image generating unit 203 sets the K color component among the CMYK color components to 0, increases the density values of the CMY color components by an amount corresponding to the K color component to obtain CMY color components for a background image, and generates background image dots using the obtained CMY color components.

Next, the latent image generating unit 202 generates dispersed latent image dots, which include the K color component and represent embedded information, to have an area ratio less than or equal to a threshold. In this step, the latent image dots may be generated in substantially the same manner as in the above described case where the background image dots are generated before the latent image dots. Here, in pixels within the boundary of the latent image where the latent image dots are not placed, the background image dots are placed. In the example of FIG. 4 (E), the background image dots are placed in the pixels "c" within the boundary "d" of the latent image "a". This method makes it possible to generate an output image where the embedded image is not clearly distinguishable from the input image, but the latent image is still detectable on an infrared image obtained from the output image.

<Process of Obtaining Scanned Image>

Next, an exemplary process of obtaining a scanned image by scanning an original printed material on which an output image is printed is described with reference to FIG. 6. In this exemplary process, it is assumed that an output image generated by the output image generating unit 206 is printed on paper. The output image may be printed by the image forming apparatus 2 or any other apparatus that uses toner or ink having an infrared-absorption property.

In step S21, the infrared scanner 3 scans the paper (original) on which the output image is printed. The infrared scanner 3 illuminates the paper with infrared rays and converts reflected light (infrared rays) detected by a sensor into an electric signal.

In step S22, the infrared scanner 3 obtains a scanned image (infrared image) based on the electric signal.

In step S23, the infrared scanner 3 sends the scanned image to the terminal 1. When the scanned image is to be displayed, the process proceeds to step S24 where the terminal 1 displays the scanned image (infrared image) received via the network I/F 103 on the display unit 11.

Meanwhile, when the scanned image is to be printed, the process proceeds to step S25 where the terminal 1 sends a print command together with the scanned image to the image forming apparatus 2. In step S26, the laser printer 23 of the image forming apparatus 2 prints the scanned image (infrared image) received from the terminal 1.

The user can check the latent image (which is made visible by the infrared scanning) in the scanned image (infrared image, see FIG. 4 (D)) that is displayed on the display unit 11 or printed by the image forming apparatus 2.

<Variation>

A variation of the above embodiment is described below. FIG. 7 is a drawing illustrating an example of an infrared image of a printed material according to a variation of the above embodiment. Below, differences between the above embodiment and the variation are mainly discussed, and descriptions overlapping those in the above embodiment may be omitted.

In the above embodiment, embedded information is represented by dispersed latent image dots including the K color component and background dots are generated using the CMY color components. In this variation, the background image generating unit 203 generates background image dots including the K color component. The background image dots including the K color component are arranged in a dispersed dot pattern to have an area ratio less than a threshold (e.g., 5%).

Meanwhile, the latent image generating unit 202 obtains color components of the background image dots and adjusts color components of latent image dots based on the color components of the background image dots such that the background image dots and the latent image dots have substantially the same color. In this case, the latent image dots are generated using the CMY color components to represent a character string indicating embedded information.

For example, the latent image dots are generated as described below. The K color component of the background image dots is set to 0 and the density values of the CMY color components are increased by an equal amount corresponding to the density value of the K color component to obtain CMY color components for the latent image dots. Then, the brightness, hue, and saturation of the obtained CMY color components are adjusted to make the color of the latent image dots substantially the same as the color of the background image dots. As a result, it becomes difficult to distinguish the latent image dots from the background image dots by the naked eye.

In this variation, the K color component is used for the background image dots and not used for the latent image dots. Accordingly, when an embedded image obtained by combining the background image dots and the latent image dots is printed on a printed material (original), the K toner that absorbs infrared rays is used for the background image dots but not used for the latent image dots.

When the printed material is scanned with infrared rays, an infrared image (scanned image) as illustrated by FIG. 7 is obtained. In the infrared image of FIG. 7, since the K toner of the background image dots absorbs infrared rays, the background of characters looks dark (has high density). Meanwhile, since the latent image dots do not include the K toner, the characters look bright (have low density). Accordingly, the latent image representing embedding information (in the example, of FIG. 7 "0123456789 XXX SECTION RICH TARO") appears as outline characters.

Similarly to the above embodiment, this variation also makes it possible to generate an output image such that embedded information is not visible by the naked eye on a printed material but is visible on an infrared image of the printed material. Also, since the background dots including the K color component are not copied using the K toner, it is possible to determine whether a printed material is an original or a copy based on an infrared image of the printed material.

Second Embodiment

Next, a second embodiment is described. In the second embodiment, latent image dots including the K color component are arranged to have an area ratio greater than a predetermined threshold. Below, differences from the first embodiment are mainly described.

The latent image generating unit 202 generates latent image dots representing embedded information using color components including the K color components such that the area ratio of the latent image dots including the K color component exceeds a threshold of 5%. As described above, dispersed dots with an area ratio less than or equal to the threshold of 5% are determined as dust by the copier. In the second embodiment, the latent image dots including the K color component are arranged to have an area ratio greater than the threshold of 5%. As a result, the latent image dots representing the embedded information are copied by the copier using the K toner and the embedded image on a copied printed material also includes the background image dots not including the K toner and the latent image dots including the K toner.

Here, similarly to the first embodiment, any toner or ink having an infrared-absorption property may be used instead of the K toner. That is, the image forming apparatus 2 may use any combination of toner or ink having the infrared-absorption property and toner of ink not having the infrared-absorption property. Accordingly, the second embodiment also makes it possible to generate an embedded image including dots that absorb infrared rays and dots that do not absorb infrared rays.

Also, the second embodiment is not limited to a method where the latent image and the background image are distinguished from each other based on the difference in the infrared-reflection property between the K toner and the CMY toners. That is, color materials having different properties for a type of radiation (or light) other than infrared rays may also be used to distinguish the latent image and the background image. For example, color materials having different properties for ultraviolet rays may be used. In this case, the second method and the third method described in the first embodiment may be used. When the second or third method is used, a copier for copying an original printed material needs to use a Y toner including an ultraviolet-reflecting material or a K toner including an ultraviolet-reflecting material.

According to the second embodiment, not only on an original printed material but also on a copied printed material, the background image and the latent image in the embedded image have different infrared-reflection properties (or infrared-absorption properties). Therefore, the embedded information represented by the latent image is also detectable on an infrared image obtained by scanning the copied printed material with infrared rays. The second embodiment may be used to trace the origin of a document. For example, when information about an original printed material is used as embedded information, it is possible to trace the origin of a copied printed material by viewing the embedded information on an infrared image of the copied printed material.

Third Embodiment

In a third embodiment, the terminal 1 may also include a color proportion adjusting unit that adjusts (or sets) the area ratio (or proportion per unit area) of latent image dots including the K color component to a value less than or equal to a predetermined threshold or to a value greater than the threshold. The color proportion adjusting unit may be included in the latent image generating unit 202. The terminal 1 may further include a dot pattern selecting unit that determines whether latent image dots including the K color component are arranged in a dispersed dot pattern (where dots are dispersed or isolated) or in a non-dispersed dot pattern (where dots are not dispersed or isolated). The dot pattern selecting unit may be included in the latent image generating unit 202. Below, differences from the first embodiment are mainly described with reference to FIG. 9.

Figure 9:
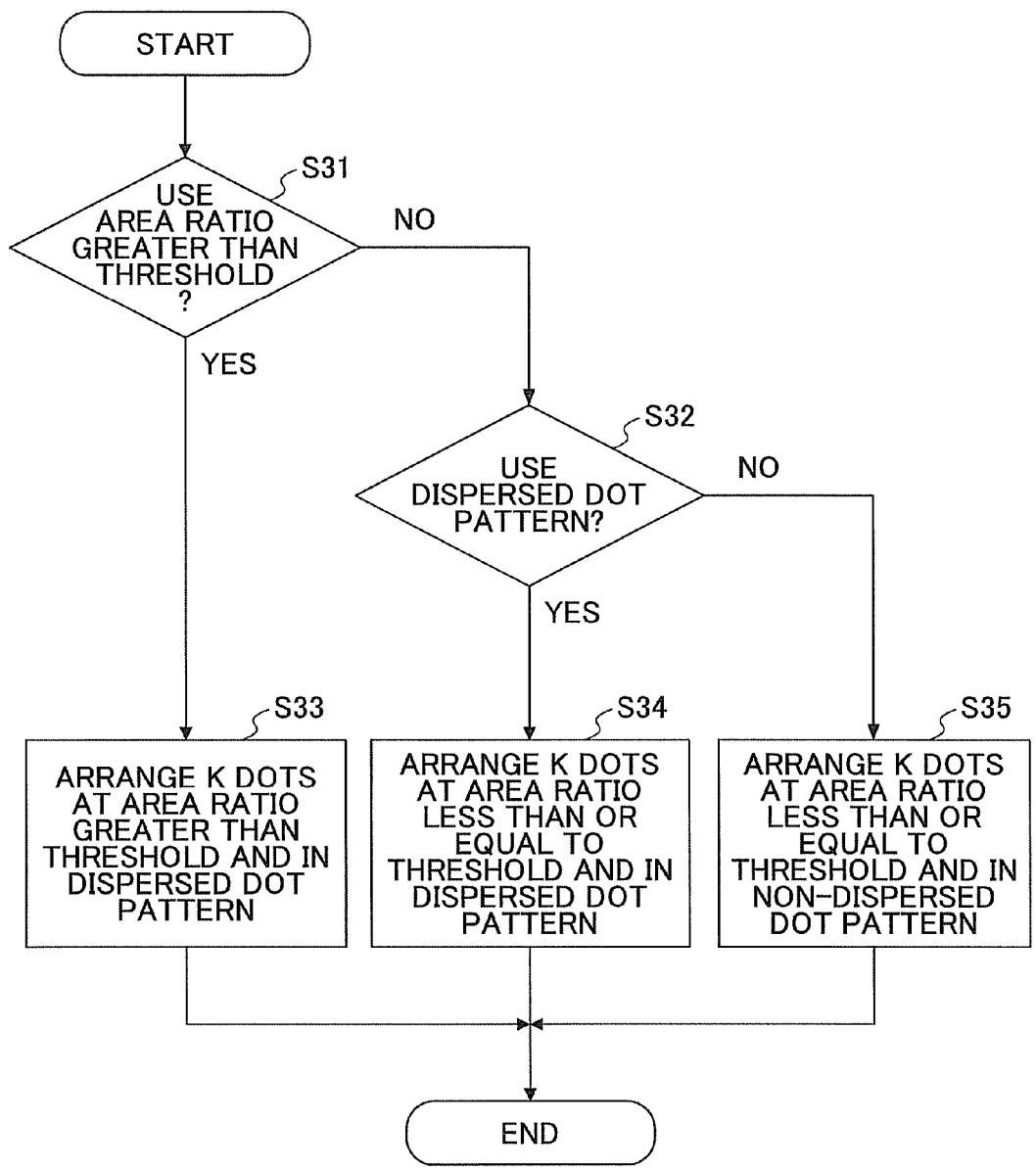
FIG. 9 is a flowchart illustrating a process of generating a latent image according to a third embodiment.

For example, the latent image generating unit 202 performs a process as described below according to a user input entered via the operations unit 12, an external input received via the network I/F 103, or settings stored beforehand in the memory 102. In FIG. 9, the latent image generating unit 202 determines whether to set the area ratio of the latent image dots including the K color component at a value greater than a predetermined threshold (step S31). When it is determined to set the area ratio at a value greater than the threshold, the process proceeds to step S33. Meanwhile, when it is determined to set the area ratio at a value less than or equal to the threshold, the process proceeds to step S32.

At step S32, the latent image generating unit 202 determines whether to arrange the latent image dots including the K color component in a dispersed dot pattern or a non-dispersed dot pattern based on a user input entered via the operations unit 12, an external input received via the network I/F 103, or a setting stored beforehand in the memory 102. When it is determined to arrange the latent image dots in the dispersed dot pattern, the process proceeds to step S34. Meanwhile, when it is determined to arrange the latent image dots in the non-dispersed dot pattern, the process proceeds to step S35.

At step S34, i.e., when the area ratio of the latent image dots including the K color component is set at a value less than or equal to the threshold (NO at step S31) and the dispersed dot pattern is selected (YES at step S32), the latent image generating unit 202 generates the latent image dots as described in the first embodiment. That is, the latent image generating unit 202 generates the latent image dots such that the area ratio (or proportion) of the latent image dots becomes less than or equal to the threshold and the latent image dots are arranged in the dispersed dot pattern within the boundary of the latent image. Then, the background image dots not including the K color component are placed inside and outside of the boundary of the latent image to generate an embedded image.

When the embedded image generated in this manner is printed on an original printed material and the original printed material is copied by a copier, the latent image dots including the K color component are determined by the copier as dust as described in the first embodiment. Therefore, the latent image dots are not copied using the K toner. On the copied printed material, the latent image dots copied without using the K toner have an infrared-reflection property that is substantially the same as that of the background image dots. Accordingly, even on an infrared image of the copied printed material, the latent image dots are not distinguishable from the background image dots. Meanwhile, even on an infrared image of the original printed material, the latent image dots can be distinguished from the background image dots. Thus, it is possible to distinguish the copied printed material from the original printed material.

At step S33, i.e., when it is determined to set the area ratio of the latent image dots including the K color component at a value greater than the threshold (YES at step S31), the latent image generating unit 202 generates the latent image dots as described in the second embodiment. That is, the latent image generating unit 202 generates the latent image dots such that the area ratio (or proportion) of the latent image dots arranged within the boundary of the latent image becomes greater than the threshold. In the case of step S33, the latent image dots may be arranged in the dispersed dot pattern. Then, the background image dots not including the K color component are placed inside and outside of the boundary of the latent image to generate an embedded image.

When the embedded image generated in this manner is printed on an original printed material and the original printed material is copied by a copier, the latent image dots including the K color component are not determined by the copier as dust and therefore copied using the K toner as described in the second embodiment. On the copied printed material, the latent image dots copied using the K toner have an infrared-reflection property that is different from that of the background image dots. Accordingly, within an infrared image of the copied printed material, the latent image dots are distinguishable from the background image dots. This makes it possible to obtain embedded information even from a copied printed material and thereby makes it possible to trace the origin of the copied printed material.

At step S35, i.e., when the area ratio of the latent image dots including the K color component is set at a value less than or equal to the threshold (NO at step S31) and the non-dispersed dot pattern is selected (NO at step S32), the latent image generating unit 202 generates the latent image dots as described below. That is, the latent image generating unit 202 generates the latent image dots such that the area ratio (or proportion) of the latent image dots arranged within the boundary of the latent image becomes less than or equal to the threshold and the latent image dots are arranged in the non-dispersed dot pattern within the boundary of the latent image (i.e., at least some dots are arranged adjacent to each other).

In this case, the latent image dots including the K color component are arranged within the boundary of the latent image such that two or more dots are adjacent to each (i.e., not all the dots are isolated). Still, however, the latent image dots are arranged such that the area ratio does not exceed the threshold. For example, when the dots "b" are placed in two pixels in a matrix of 8×8 pixels (64 pixels) as in FIG. 4 (E), the area ratio of the dots "b" in the image "a" becomes 2/64=0.03125 which is less than the threshold of 5%. In the case of step S35, however, the two dots "b" are arranged adjacent to each other instead of in a dispersed dot pattern as illustrated in FIG. 4 (E). Then, the background image dots not including the K color component are placed inside and outside of the boundary of the latent image to generate an embedded image.

When the embedded image generated in this manner is printed on an original printed material and the original printed material is copied by a copier, the latent image dots including the K color component are not determined by the copier as dust and therefore copied using the K toner as described in the second embodiment. On the copied printed material, the latent image dots copied using the K toner have an infrared-reflection property that is different from that of the background image dots. Accordingly, on an infrared image of the copied printed material, the latent image dots are distinguishable from the background image dots. This makes it possible to obtain embedded information even from a copied printed material and thereby makes it possible to trace the origin of the copied printed material.

In the exemplary process of FIG. 9, when it is determined to set the area ratio of the latent image dots including the K color component at a value greater than the threshold (YES at step S31), step S33 is performed without determining whether to use the dispersed dot pattern or the non-dispersed dot pattern. Alternatively, a step of selecting the dispersed dot pattern or the non-dispersed dot pattern may be performed even when the result of step S31 is YES.

In this case, when the dispersed dot pattern is selected, step S33 is performed. Meanwhile, when the non-dispersed dot pattern is selected, the latent image dots including the K color component are arranged in the non-dispersed dot pattern such that the area ratio becomes greater than the threshold.

Also in this case, similarly to steps S33 and S35, the latent image dots including the K color component are copied by a copier using the K toner. Accordingly, the latent image dots have an infrared-reflection property different from that of the background image dots even on a copied printed material, and the latent image dots are distinguishable from the background image dots on an infrared image of the copied printed material. Thus, even in this case, it is possible to obtain embedded information from a copied printed material and to trace the origin of the copied printed material based on the embedded information.

In the exemplary process of FIG. 9, the area ratio of the latent image dots is determined (step S31) and then the dot pattern is selected (step S32). Alternatively, the dot pattern may be selected before determining the area ratio of the latent image dots. Also, steps S31 and S32 may be performed at the same time. In any case, the latent image dots are arranged based on a selected combination of the area ratio and the dot pattern as described above with reference to FIG. 9.

In the exemplary process of FIG. 9, it is assumed that the latent image dots include the K color component and are distinguished from the background image based on the different in the infrared-reflection property. However, the present invention is not limited to the above described embodiment. For example, the background image dots may be generated using color components including the K color component and the latent image dots may be generated using color components not including the K color component. Even in this case, the latent image dots can be distinguished from the background image based on the different in the infrared-reflection property.

Also, as described above, any toner or ink having an infrared-absorption property may be used instead of the K toner. That is, the image forming apparatus 2 may use any combination of toner or ink having the infrared-absorption property and toner of ink not having the infrared-absorption property. Accordingly, the third embodiment also makes it possible to generate an embedded image including dots that absorb infrared rays and dots that do not absorb infrared rays.

Also, the third embodiment is not limited to a method where the latent image and the background image are distinguished from each other based on the difference in the infrared reflection property between the K toner and the CMY toners. That is, color materials having different properties for a type of radiation (or light) other than infrared rays may also be used to distinguish the latent image and the background image. For example, color materials having different properties for ultraviolet rays may be used. In this case, the second method and the third method described in the first embodiment may be used. When the second or third method is used, a copier for copying an original printed material needs to use a Y toner including an ultraviolet-reflecting material or a K toner including an ultraviolet-reflecting material.

Other Embodiments

Other embodiments of the present invention are described below.

The terminal 1 may be implemented by a mobile information terminal such as a cell phone, a smartphone, or a personal digital assistant (PDA) where an unauthorized copy determining application is installed. The mobile information terminal may include a camera including infrared-emitting function. The camera illuminates a document with infrared rays and detects light (infrared rays) reflected from the document to obtain an infrared image. Here, it is assumed that copying the document is not allowed and an embedded image generated according to the method of the first embodiment is printed on the document.

When the document is an original, the latent image is distinguishable from the background image and the embedded information is detectable in the obtained infrared image as exemplified by FIG. 4 (D). Meanwhile, when the document is a copy, the latent image is not distinguishable from the background image and the embedded information is not detectable in the obtained infrared image. Thus, it is possible to distinguish a copy from an original using the obtained infrared image.

The unauthorized copy determining application includes a function to automatically determine whether a document is an original or a copy when an infrared image of the document is obtained. When the document is a copy, the unauthorized copy determining application automatically reports to a registered system administrator that the document is a copy.

The function to automatically determine whether a document is an original or a copy may be implemented as described below. For example, the mobile information terminal may include a function that automatically reads characters represented by the latent image in the infrared image via an optical character reader (OCR). In this case, the unauthorized copy determining application determines that the document is an original when the characters represented by the latent image can be read by the OCR and determines that the document is a copy when the characters represented by the latent image cannot be read by the OCR.

An aspect of disclosure provides an information processing apparatus, an image generating method, and a storage medium storing a program for causing a computer to perform the image generating method that make it possible to generate an image for guaranteeing the originality of a printed material or tracing the origin of the printed material without using a dedicated or special color material.

An information processing apparatus, an image generating method, and a storage medium storing a program for causing a computer to perform the image generating method are described above as preferred embodiments. However, the present invention is not limited to the specifically disclosed embodiments, and variations and modifications may be made without departing from the scope of the present invention.

What is claimed is:

1. An information processing apparatus, comprising:
a latent image generating unit configured to generate a latent image;
a background image generating unit configured to generate a background image that serves as a background of the latent image; and
a print image generating unit configured to generate a print image including the latent image and the background image,
wherein the latent image generating unit is configured to
generate the latent image using both of a first color component to be printed with a first color material and second color components to be printed with second color materials having an optical property different from an optical property of the first color material, or
generate the latent image using only the second color components;
wherein the background image generating unit is configured to
generate the background image using only the second color components when the latent image generating unit uses both of the first color component and the second color components, and
generate the background image using both of the first color component and the second color components when the latent image generating unit uses only the second color components; and
wherein the latent image generating unit and the background image generating unit are configured to generate the latent image and the background image using the first color component and the second color components such that the latent image and the background image in the print image are printed in substantially a same color.

2. The information processing apparatus as claimed in claim 1, further comprising:
a color proportion adjusting unit configured to adjust a proportion per unit area of the first color component used for the latent image or the background image.

3. The information processing apparatus as claimed in claim 1, further comprising:
a dot pattern selecting unit configured to determine whether an isolated or quasi-isolated dot pattern or a non-isolated dot pattern is used to arrange dots of the latent image generated using the first color component.

4. The information processing apparatus as claimed in claim 1, further comprising:
a color-component value correction unit,
wherein the latent image generating unit is configured to generate the latent image using both of the first color component and the second color component;
wherein the background image generating unit is configured to convert values of the first color component and the second color components used to generate each dot of the latent image into values of the second color components used to generate each dot of the background image; and
wherein the color-component value correction unit is configured to correct a relationship between the value of the first color component used for each dot of the latent image and the values of the second color components used for each dot of the background image based on predetermined condition information.

5. The information processing apparatus as claimed in claim 1, wherein the first color material is a K color material and the second color materials are CMY color materials.

6. A method performed by an information processing apparatus, the method comprising:
- generating a latent image;
- generating a background image that serves as a background of the latent image; and
- generating a print image including the latent image and the background image,
- wherein the latent image is generated
  - using both of a first color component to be printed with a first color material and second color components to be printed with second color materials having an optical property different from an optical property of the first color material, or
  - using only the second color components;
- wherein the background image is generated
  - using only the second color components when the latent image is generated using both of the first color component and the second color components, or
  - using both of the first color component and the second color components when the latent image is generated using only the second color components; and
- wherein the latent image and the background image are generated using the first color component and the second color components such that the latent image and the background image in the print image are printed in substantially a same color.

7. The method as claimed in claim 6, further comprising:
adjusting a proportion per unit area of the first color component used for the latent image or the background image.

8. The method as claimed in claim 6, further comprising:
determining whether an isolated or quasi-isolated dot pattern or a non-isolated dot pattern is used to arrange dots of the latent image generated using the first color component.

9. The method as claimed in claim 6,
- wherein the latent image is generated using both of the first color component and the second color component;
- wherein values of the first color component and the second color components used to generate each dot of the latent image are converted into values of the second color components used to generate each dot of the background image; and
- wherein a relationship between the value of the first color component used for each dot of the latent image and the values of the second color components used for each dot of the background image is corrected based on predetermined condition information.

10. The method as claimed in claim 6, wherein the first color material is a K color material and the second color materials are CMY color materials.

11. A non-transitory computer-readable storage medium storing program code for causing a computer to perform a method, the method comprising:
- generating a latent image;
- generating a background image that serves as a background of the latent image; and
- generating a print image including the latent image and the background image,
- wherein the latent image is generated
  - using both of a first color component to be printed with a first color material and second color components to be printed with second color materials having an optical property different from an optical property of the first color material, or
  - using only the second color components;
- wherein the background image is generated
  - using only the second color components when the latent image is generated using both of the first color component and the second color components, or
  - using both of the first color component and the second color components when the latent image is generated using only the second color components; and
- wherein the latent image and the background image are generated using the first color component and the second color components such that the latent image and the background image in the print image are printed in substantially a same color.

12. The storage medium as claimed in claim 11, the method further comprising:
adjusting a proportion per unit area of the first color component used for the latent image or the background image.

13. The storage medium as claimed in claim 11, the method further comprising:
determining whether an isolated or quasi-isolated dot pattern or a non-isolated dot pattern is used to arrange dots of the latent image generated using the first color component.

14. The storage medium as claimed in claim 11,
- wherein the latent image is generated using both of the first color component and the second color component;
- wherein values of the first color component and the second color components used to generate each dot of the latent image are converted into values of the second color components used to generate each dot of the background image; and
- wherein a relationship between the value of the first color component used for each dot of the latent image and the values of the second color components used for each dot of the background image is corrected based on predetermined condition information.

15. The storage medium as claimed in claim 11, wherein the first color material is a K color material and the second color materials are CMY color materials.

* * * * *